Mar. 5, 1929.  J. CHIPMAN ET AL  1,703,923
SOCKET AND BLADE
Filed April 7, 1926
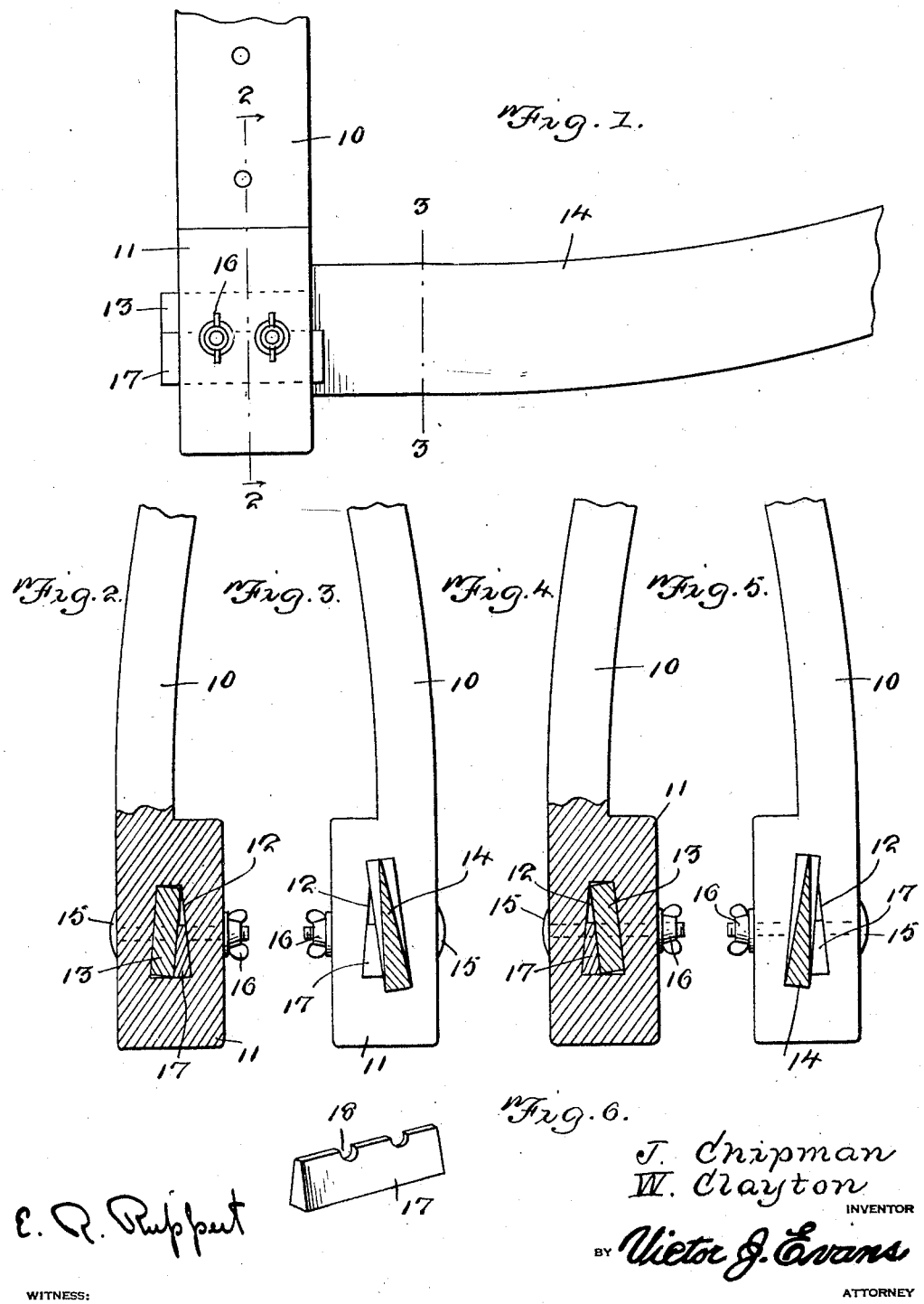

Patented Mar. 5, 1929.

1,703,923

UNITED STATES PATENT OFFICE.

JAMES CHIPMAN AND WILLIAM CLAYTON, OF BREESE, ILLINOIS.

SOCKET AND BLADE.

Application filed April 7, 1926. Serial No. 100,382.

This invention relates to improvements for use upon sneads and scythe handles, embodying among other characteristics a socket portion to accommodate a portion of a blade.

Another object comprehends the provision of a wedge member adapted to alter the pitch of the blade.

With the above and other objects in view, the invention further includes the following novel features and details of construction, to be hereinafter more fully described, illustrated in the accompanying drawings and pointed out in the appended claim.

In the drawing:—

Figure 1 is a fragmentary elevation of a snead and scythe blade associated therewith.

Figure 2 is a sectional view taken on line 2—2 of Fig. 1.

Figure 3 is a sectional view taken on line 3—3 of Fig. 1.

Figures 4 and 5 are views similar to Figures 2 and 3 and which have shown the reversed position or inclination of the blade and the retaining element.

Figure 6 is a perspective of the wedge per se.

Referring to the drawing in detail, wherein like characters of reference denote corresponding parts, the reference character 10 indicates the snead of a scythe handle having an enlarged end portion 11 provided with a transversely disposed elongated tapered socket or opening 12 adapted to receive the shank end 13 of a scythe blade 14.

Fastening means in the form of bolts 15 are extended through the socket openings 12 and having wing nuts 16 secured upon their opposite ends for adjustably securing the shank ends 13 of the scythe blade 14 therein.

In order to provide means within the socket 12 for co-operation with the blade 14 to set the latter in a desired position we provide a wedge shaped member 17 having cutout portion 18 upon the apex or narrow edge thereof adapted to receive the bolts 15 to prevent displacement when called into use.

It will thus be noted that the pitch of the blade 14 may be altered to accommodate the same upon its work whereby stalks may be cut at appropriate heights.

The invention is susceptible of various changes in its form, proportions and minor details of construction, and the right is herein reserved to make such changes as properly fall within the scope of the appended claim.

Having thus described the invention, what is claimed is:—

A snead having an enlarged portion upon one end thereof, said portion being provided with a horizontally disposed wedge-shaped socket open at each end, a wedge carried within the socket to alter the pitch of the shank of a blade, and said wedge having cut-out portions in the apex thereof to accommodate the adjacent portions of fastening elements passed through the socket and blade shank to prevent shifting and displacement of the latter.

In testimony whereof we affix our signatures.

JAMES CHIPMAN.
WILLIAM CLAYTON.